Patented Aug. 16, 1938

2,127,381

UNITED STATES PATENT OFFICE 2,127,381

COMBINATIONS OF POLYMERIZED VINYL COMPOUNDS AND WAXES

Willy O. Herrmann and Wolfram Haehnel, Munich, Germany, assignors, by mesne assignments, to Chemische Forschungsgesellschaft, m. b. H., Munich, Germany, a corporation of Germany No Drawing. Application March 3, 1934, Serial No. 713,946. In Germany March 8, 1933

22 Claims. (Cl. 18—48.3)

Polyvinyl compounds only homogeneously take up 1–2% of wax or wax-like bodies. We have found that macroscopically homogeneous combinations may be produced with, for instance, a content of 3–20% of wax, if the wax or the wax-like substances are added to unpolymerized vinyl compounds or their solution, and the polymerization is performed in their presence.

As unpolymerized vinyl compounds may be considered, for instance, the esters of vinyl alcohol, particularly vinyl acetate and vinyl chloride, acrylic acid ester, itaconic acid ester, styrol and the like, or mixtures of such substances.

The various natural wax types, such as beeswax, carnauba wax, palm wax, spermaceti, etc., but likewise synthetic waxes, as well as substances with similar properties, such, for instance, as ceresin, ozokerite, paraffin and the like, or mixtures of such bodies are considered herein as waxes.

The mixture of the wax-like additions with the mono-vinyl compounds may be effected by immediate solution in them, particularly under increased temperature. But the mixture may also be effected by dissolving the wax-like bodies together with the vinyl compounds in a solvent and in this medium the polymerization of the mixture may be made. As solvents, there may be used, for example, esters, hydrocarbons or any other solvent known for the particular wax or mixture of waxes used.

If it is desired to incorporate into the vinyl compounds particularly large quantities of wax and the like, e. g. 20–50%, or to produce transparent combinations instead of cloudy ones, as they are in the polymerized state, solvents are added to the mixture. As such may be used, e. g., resins, artificial resins, gums, fatty acid phthalides, and the like. These additions may be made, both before and after the polymerization.

The properties of the combinations so obtainable may be adapted to the respective purposes of application before or after polymerization through the admixture of other plastic substances as, for instance, nitro-cellulose, or cellulose-acetate, or softeners, as, e. g., phthalates, pulverized or fibrous fillers, pigments, and the like, within a wide range.

The homogeneous incorporation of wax and the like increases the hardness of the polymerizates and the above mixtures as its consequence. The addition of wax likewise reduces the brittleness and fragility of the masses which consist to a great extent of brittle polymerizates, such as polyvinyl chloride. Furthermore, in the combinations containing wax and the like, the otherwise disturbing property, namely, that objects coated with them bake together when superposed, is reduced. Hereby, however, the adhesiveness of the coating and the like is not reduced on surfaces of the most diverse kind. Finally, the new combinations are conspicuous, among other things, by their surprising tightness against gases, steam and liquids, particularly also against water, as well as by an increased resistance to chemical agents, particularly acids.

These advantageous properties make the new products pre-eminently suited as press masses for the most varied applications, particularly also for the production of phonograph records, die casting, the production of lacquers, coatings of the most varied objects, films, threads, for encaustic purposes and the like.

Example 1

A mixture of 950 parts of vinyl acetate, 50 parts of beeswax, 500 parts of benzol and 9.5 parts of benzoyl superoxide is boiled three hours in a reflux condenser. By concentration in vacuum there is obtained 990 grams of a macroscopically homogeneous porcelain-like finish polymerizate. This product is suitable, if desired after incorporation of suitable fillers, for the production of phonograph records. It goes into clear solution in a mixture of toluol and butyl acetate and produces in this form an excellent lacquer.

Example 2

100 parts of vinyl chloride, dissolved in 900 parts of acetone, are mixed with ten parts of carnauba wax and 1% benzoyl superoxide until dissolved and then exposed to sunlight until it polymerizes. After evaporation of the volatile components, a valuable solid mass is obtained which is suitable, among other things, in combination with proper additions and fillers, for press masses and for the manufacture of records.

Example 3

In order to produce a press mass, the following procedure is adopted: In a kneading device 100 parts of a polymerizate produced by polymerization of vinyl acetate in the presence of beeswax similar to the process described in Example 1 with 7% wax content are kneaded with acetone or other suitable solvent until a thick tough paste is obtained. To this 20 parts of magnesium oxide, 20 parts of iron oxide and 3 parts of carbon black are added. The mass is kneaded to homogeneity and then freed from the volatile solvent in a drier. The dry product may be pulverized, if desired, and may be utilized for press masses or die castings.

Naturally, according to the desired purposes, other fillers and pigments and other masses may be utilized. Also other substances, such as artificial or natural resins or cellulose esters may be admixed. Furthermore, the known white or colored fillers may also be added, as, for instance MgO and cellulose fibers, whereupon a white press mass is obtained.

*Example 4*

In order to produce a phonograph record mass, the following process may, for instance, be pursued:

Vinyl acetate is polymerized in the presence of carnauba wax, so that a polymerizate is obtained with 8% wax content. 120 parts of it are mixed with 30 parts natural shellac, 120 parts ground shale, 50 parts asbestos flour and 10 parts of carbon black and well stirred on the conventional hot roller used in the manufactures of phonograph record masses and hot calendered in the usual manner. These calendered plates are provided in the usual manner with the sound grooves by being preheated and pressed between dies. The quantitative ratios may be varied, as well as the kind of filler and the resins. Instead of natural shellac other natural or artificial resins and cellulose esters may be utilized.

The records produced according to the above examples may be simply pressed over and they are also thereby superior to the conventional records.

The invention claimed is:

1. Process of increasing the hardness of polymerized vinyl compounds which consists in adding a wax to a substantially unpolymerized monovinyl compound selected from the group consisting of the esters of acrylic and itaconic acids, the esters of vinyl alcohol, and styrol, and then polymerizing a solution of the mixture.

2. Process of increasing the hardness of polymerized vinyl compounds which consists in adding a wax to a solution of a substantially unpolymerized monovinyl compound selected from the group consisting of the esters of acrylic and itaconic acids, the esters of vinyl alcohol, and styrol, and then polymerizing a solution of the mixture.

3. Process of increasing the hardness of polymerized esters of vinyl alcohol which consists in adding a wax to a substantially unpolymerized ester of vinyl alcohol and then polymerizing a solution of the mixture.

4. Process of increasing the hardness of polymerized vinyl acetate which consists in adding a wax to a substantially unpolymerized vinyl acetate and then polymerizing a solution of the mixture.

5. Process of increasing the hardness of polymerized vinyl acetate which consists in adding a wax to a solution of a substantially unpolymerized vinyl acetate and then polymerizing a solution of the mixture.

6. Process of increasing the hardness of polymerized vinyl chloride which consists in adding a wax to a substantially unpolymerized vinyl chloride and then polymerizing a solution of the mixture.

7. Process of increasing the hardness of polymerized mixtures of acetates and chlorides of vinyl alcohol which consists in adding a wax to substantially unpolymerized mixtures of acetates and chlorides of vinyl alcohol and then polymerizing a solution of the mixture.

8. Process of increasing the hardness of polymerized vinyl compounds which consists in adding a wax and an addition facilitating the solution of said wax to a substantially unpolymerized vinyl compound selected from the group consisting of the esters of acrylic and itaconic acids, the esters of vinyl alcohol, and styrol, and then polymerizing a solution of the mixture.

9. Process of increasing the hardness of polymerized vinyl acetate which consists in adding a wax and an addition facilitating the solution of said wax to a substantially unpolymerized vinyl acetate and then polymerizing a solution of the mixture.

10. Process of increasing the hardness of polymerized vinyl compounds which consists in adding a wax to a substantially unpolymerized monovinyl compound selected from the group consisting of the esters of acrylic and itaconic acids, the esters of vinyl alcohol, and styrol, and polymerizing a solution of the mixture and then adding other plastic masses thereto.

11. Process of increasing the hardness of polymerized vinyl acetate which consists in adding a wax to a solution of a substantially unpolymerized vinyl acetate and then polymerizing a solution of the mixture and then adding other plastic masses thereto.

12. Process of increasing the hardness of polymerized vinyl compounds which consists in adding a wax to a substantially unpolymerized monovinyl compound selected from the group consisting of the esters of acrylic and itaconic acids, the esters of vinyl alcohol, and styrol, and then polymerizing a solution of the mixture, and then adding thereto substances selected from the group consisting of softeners, powdery and fibrous organic and mineral fillers, pigments, and natural and synthetic resins.

13. A hard composition consisting of monovinyl compounds interpolymerized with more than 2% of a homogeneously dispersed wax.

14. A hard composition consisting of esters of vinyl alcohol interpolymerized with more than 2% of a homogeneously dispersed wax.

15. A hard composition consisting of vinyl acetate interpolymerized with more than 2% of a homogeneously dispersed wax.

16. A hard composition consisting of vinyl chloride interpolymerized with more than 2% of a homogeneously dispersed wax.

17. A hard composition consisting of mixtures of vinyl acetate and vinyl chloride interpolymerized with more than 2% of a homogeneously dispersed wax.

18. A hard composition consisting of monovinyl compounds interpolymerized with more than 2% of a homogeneously dispersed wax and an addition facilitating the solution of said wax.

19. A hard composition consisting of monovinyl compounds interpolymerized with more than 2% of a homogeneously dispersed wax and another plastic mass.

20. A hard composition consisting of vinyl acetate interpolymerized with more than 2% of a homogeneously dispersed wax and at least one addition selected from the group consisting of softeners, powdery and fibrous organic and mineral fillers, pigments, natural and synthetic resins and plastic masses.

21. A hard mass for moulding phonograph records consisting of the combination of a vinyl compound interpolymerized with more than 2% of a homogeneously dispersed wax and at least one addition selected from the group consisting of softeners, powdery and fibrous organic and mineral fillers, pigments, natural and synethetic resins and plastic masses.

22. Process of producing phonograph records containing polymerized vinyl acetate which consists in adding more than 2% of a wax to a substantially unoplymerized vinyl acetate, polymerizing a solution of the mixture and then adding to the product substances selected from the group consisting of softeners, powdery and fibrous organic and mineral fillers, pigments, natural and synethetic resins and plastic masses, mixing the ingredients, hot calendering the mixture to plates, preheating them and hot pressing them to provide sound grooves.

WILLY O. HERRMANN.
WOLFRAM HAEHNEL.